United States Patent [19]

Haas et al.

[11] 3,993,420

[45] Nov. 23, 1976

[54] RETAINER ASSEMBLY FOR MOLD PLATE

[75] Inventors: Norman C. Haas, Wheaton; Keith W. Christiansen, Fox River Grove, both of Ill.

[73] Assignee: Chicago Rawhide Manufacturing Company, Elgin, Ill.

[22] Filed: June 16, 1975

[21] Appl. No.: 587,378

[52] U.S. Cl. .............................. 425/127; 425/242 R; 425/DIG. 47
[51] Int. Cl.² ........................ B29F 1/00; B29D 3/00
[58] Field of Search ............. 425/DIG. 47, 127, 129, 425/242 R

[56] References Cited
UNITED STATES PATENTS

| | | | |
|---|---|---|---|
| 2,982,997 | 5/1961 | Peickii et al. ................. | 425/DIG. 47 |
| 2,990,206 | 6/1961 | Bagdon ........................ | 425/DIG. 47 |
| 3,773,454 | 11/1973 | Horve et al. .................. | 425/DIG. 47 |

*Primary Examiner*—J. Howard Flint, Jr.
*Attorney, Agent, or Firm*—James T. FitzGibbon

[57] ABSTRACT

A mold assembly for injection molding of precision composite articles, which is particularly adapted for use in making highly precise oil seals having a rubber body bonded to a metal mounting flange. The assembly comprises a bottom mold member adapted to be supported in fixed relation to a vertically reciprocable top mold member, the bottom member has means forming an upwardly opening annular recess for supporting therein a circular oil seal stamping of generally L-shaped cross section with an inner marginal portion extending in a radial direction into a mold cavity formed by spaced confronting surface portions of top and bottom mold members when in the closed position, and the top mold member having a downwardly opening annular recess in which a spring pressed stripper plate is retained for limited vertical movement by means of coiled spring member insertable in a groove in an edge of the stripper plate when the stripper plate is positioned in the recess in the top mold member enabling the mold assembly to be used for molding of oil seal units having stampings of different radial and axial dimensions.

7 Claims, 4 Drawing Figures

RETAINER ASSEMBLY FOR MOLD PLATE

BACKGROUND OF THE INVENTION

The present invention relates to the molding of fluent materials and is particularly concerned with improvements in apparatus for use in injection molding of precision made articles manufactured on a mass production basis.

While the invention has a number of applications it will be illustrated by reference to the production of improved oil seals, which are commonly made of curable elastomeric materials such as nitrile, acrylate and silicone rubbers, as well as more conventional synthetic and natural rubbers.

Compression and transfer molding have been very commonly used in the manufacture of such seals while injection molding has been used to a lesser extent in this industry. Injection molding of curable parts of this type has involved problems which have been difficult to overcome. In the manufacture of a typical oil seal it is necessary that the mold unit be precisely formed since seals are often required to be made to very close tolerances in order that they will fit on highly precise parts made to fine tolerances. When in use they are expected to last for extended periods. Consequently, when seals are mass produced, which is necessary for economy of production, it is a requirement that the seals be characterized by great uniformity of dimension and that the finished elastomeric material be very uniform throughout its entire extent so as to exhibit uniform properties of flexure and wear. This is difficult to achieve with injection molding apparatus annd procedures.

One form of injection molding apparatus and procedure which has solved a number of problems encountered in oil seal production is disclosed in U.S. Pat. No. 3,773,454 granted Nov. 20, 1973 to Leslie A. Horve, Jerry D. Reichenbach and Kenneth F. Gabrys, which shows an injection molding apparatus including top and bottom mole assemblies adapted to be brought together along an aligned path so as to provide a mold cavity between spaced confronting faces which cavity opens at the bottom into an annular recess in which a metal stamping is adapted to be positioned with a portion extending into the mold cavity to which fluent rubber is fed by means of a center pouring well and connecting passages through which the rubber material may flow. The top mold assembly includes a spring backed stripper plate mounted on headed pins which depend so as to form guideways and downward limit stops for plate movement in an annular recess outboard of a land forming bottom face portion of relatively small width which seats on a flange portion of the stamping when the mold is fully closed for the molding operation. A bottom face portion of the stripper plate resiliently engages the top edge of an upstanding outer flange of the stamping as the mold members approach closed position. While this apparatus will provide a highly satisfactory seal unit of the desired characteristics, experience with this and similar molding apparatus has indicated the desirability of improving the apparatus, particularly, with a view to obtaining still more efficient operation, a longer life for the apparatus and greater adaptability in handling different sizes of seal units, especially, in the handling of seal units having a metal stamping portion to which a rubber body or lip portion is to be bonded.

It is a general object of the invention to provide an injection molding apparatus which is especially adapted for the molding of precision oil seal units, which will operate with a high degree of efficiency, which will produce successive seal units which are of uniform dimensions and quality, which requires a minimum of maintenance and which is subject to mimimum wear.

A more specific object of the invention is to provide a molding apparatus of the type having top and bottom mold assemblies with cooperating surfaces defining a mold cavity and with improved means for holding in proper position a metal stamping so as to bond to a portion thereof a rubber body or lip portion which is formed in the mold cavity.

A further object of the invention is to provide a molding apparatus which is particularly adapted for injection molding of oil seals of the type having a metal stamping and a lip portion of rubber or similar moldable product wherein top and bottom mold assemblies are provided which cooperate in positioning the stamping and forming a mold cavity for the lip portion with improved hold down and stripper means which is highly efficient in operation and which is subject to mimimum wear so as to increase the life of the mold assemblies while enabling uniform mass production of the seal units.

To this end the invention embodies a molding apparatus particularly adapted for forming precision seal units, which apparatus includes top and bottom mold assemblies adapted to be opened and closed along an aligned path and having opposed surfaces which cooperate, in the closed position, to provide a mold cavity for forming from fluent rubber, or the like, a seal body, or lip member, in bonded relation to a portion of a metal stamping which is adapted to be seated in a recess adjoining the mold cavity, with the top mold assembly having a resiliently backed plate in the form of a ring member freely slidable in a recess therein, which ring member initially clamps the metal stamping in position and subsequently serves as a stripper when the mold assemblies are separated in order to remove the seal units, the ring member and associated recesses in which the metal stamping is received being capable of accommodating metal stampings of varyiing radial and axial dimensions within certain predetermined limits.

The manner in which the objects and advantages of the invention are achieved in practice will be apparent when reference is made to the accompanying detailed description of the preferred embodiment of the invention, which is set forth, by way of example, and illustrated in the accompanying drawings, wherein like reference numerals indicate corresponding parts throughout.

Although it will be understood that the principles of the present invention may be otherwise applied, a description of the invention will be made by reference to a preferred embodiment wherein the material to be injection molded is a rubber material, and wherein the article to be manufactured is a composite product, namely, an oil seal having a metal stamping portion to which there is bonded a rubber body or lip portion with the rubber body portion simultaneously formed in the mold by the process of the invention. Also it will be further understood that expressions indicating direction or orientation are used without limitation or implication that the invention requires such positions to operate, it being further understood that such positions or orientations are not ordinarily significant unless otherwise indicated.

Figure 1:
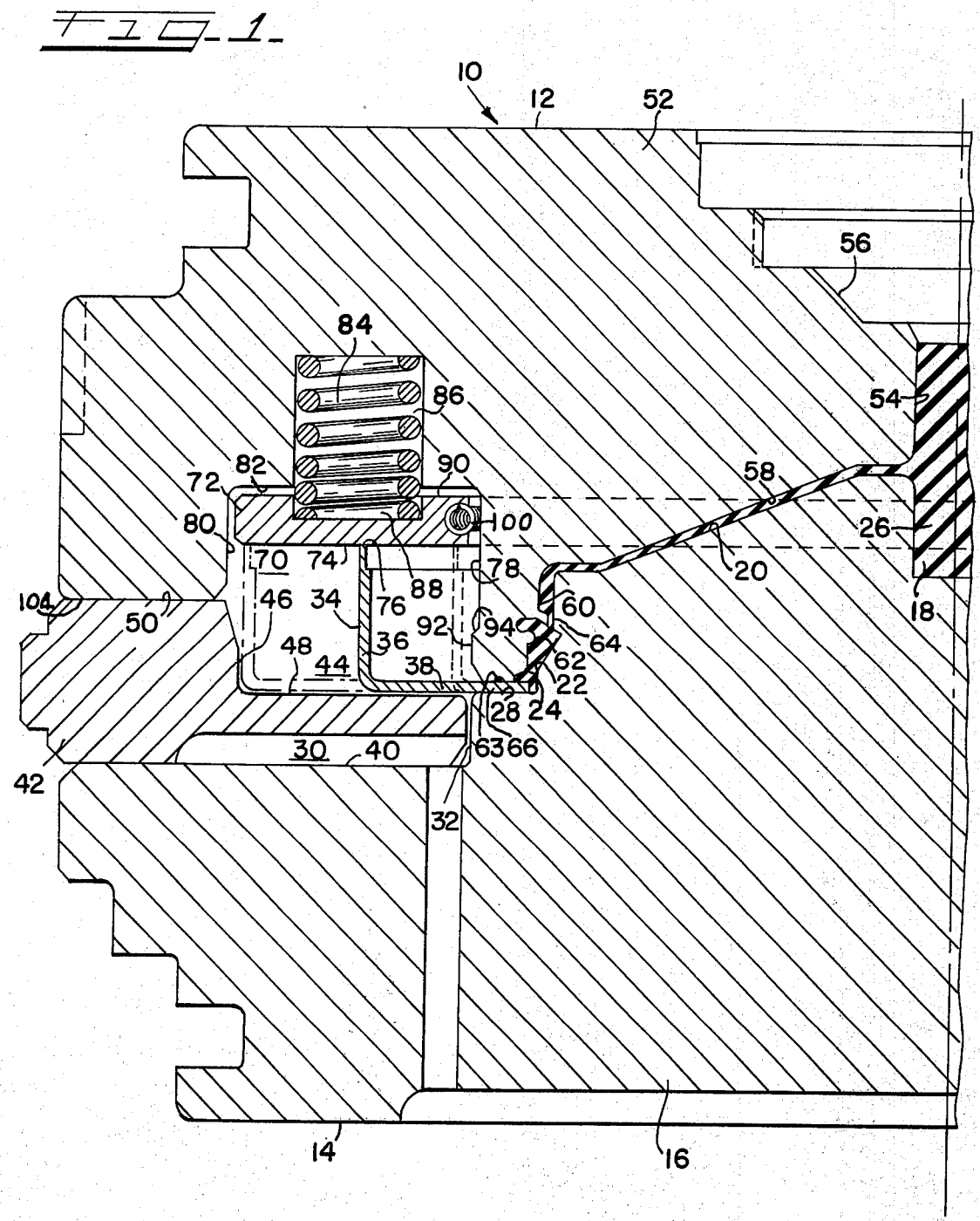
FIG. 1 is a vertical sectional view, with portions broken away, of an injection mold assembly made according to the present invention and showing the principal parts thereof in a fully closed position, with the stamping in place and the molding cavity filled with a fluent rubber product.

Referring now to the drawings in greater detail the mold assembly or mold unit, generally designated 10 in FIG. 1, includes a top or outer mold assembly or part 12 and a bottom or inner mold assembly or part 14. The bottom mold assembly 14 is generally supported in a fixed position while the top mold assembly 12 is mounted for vertical reciprocation and provided with appropriate means (not shown) for centering the same relative to the bottom mold assembly 14 when the two are brought into cooperative relation for the molding operation.

The bottom mold assembly, in the form shown, comprises a core unit or bottom mold member or part 16 (FIG. 1) which has a liquid product receiving recess or well formation 18 in the center of the top face and a surrounding top face portion 20 which is slanted radially outwardly and downwardly to a peripheral surface portion 22 which is generally vertical and which constitutes one face or wall of a molding cavity 24 in which the fluent rubber product indicated at 26 is received and cured. The vertical cavity wall 22 terminates at a shoulder forming surface 28 extending outwardly in a radial plane to the inner edge of an upwardly and outwardly opening recess 30, one side of which is defined by the vertical surface 32 on the core member 16. The shoulder 28 supports the stamping 34 which is adapted to be positioned within the mold and which is shown to be of generally L-shaped cross sectional form with an axially extending flange 36 and a radially extending flange 38 which is adapted to seat on the shoulder 28, it being understood that, as is common in oil seal practice, rubber sealing lip will be bonded to at least portions of the radially extending flange 38. The recess 30 which is defined by the vertical surface 32 and the horizontal surface 40 receives therein a ring member 42 having a groove or recess 44 on the top inner marginal portion thereof. The recess 44 is defined by a vertical face 46 and a horizontal surface 48 which is at an elevation slightly below the plane of the shoulder forming surface 28 when the ring member 42 is seated in the peripheral recess 30. The horizontal surface 48 cooperates with the inwardly facing wall surface 46, which is radially spaced from vertical surface 22 of core member 16, to provide a recess of a size to permit the desired variation in the radial dimensions of the stamping 34 which the mold is designed to accommodate. Phantom lines indicate the vertical flange position for stampings of a size larger and smaller than the one illustrated in solid line. The ring member 42 has a top marginal surface portion 50 disposed in a horizontal plane which establishes the height or elevation of the top mold assembly 12 when the latter is fully closed on the bottom mold assembly 14 as hereinafter described.

The top mold assembly 12 comprises a top mold part or member 52 having a centrally disposed bore 54 with a funnel-like top entrance formed by outwardly and upwardly tapered or stepped wall portions 56. The bore 54 is adapted to be aligned with the well formation 18 of the bottom mold part 16 and cooperates therewith to form a pouring well for introducing the liquid rubber product 26 into the mold. Extending radially of the edge of the bore 54 there is provided a surface 58 which is generally inclined downwardly and outwardly and is complementary to the core surface 20 from which it is spaced in the closed position of the mold so as to provide a passageway for the fluent rubber product. The surface 58 extends to a generally vertical peripheral wall portion 60 which has inwardly directed surfaces 62 in the lower portion thereof adapted to cooperate with the wall portions 22 on the bottom mold member 16 in forming the mold cavity 24 with a narrow entrance area at the top resulting from reduced diameter which defines a tear trim area 64. The molded product extending above this area is the scrap which will be separated from the finished seal member by tearing. The wall portion 60 extends to a downwardly facing, generally annular land 66 which constitutes the lowermost portion of the top mold member 52 and in which there is provided an annular groove 68 of relatively small depth for trapping any excess material which may be forced out of the bottom of the mold cavity 24 so that subsequently it may be disposed of in a convenient manner as waste. The land forming face 66 which has a relatively small dimension in the radial direction is adapted to seat in clamping relation on the inner margin of the annular flange 38 of the stamping 34 in the closed position of the mold, as shown in FIG. 1 and to hold the stamping in position during the molding operation.

Figure 4:
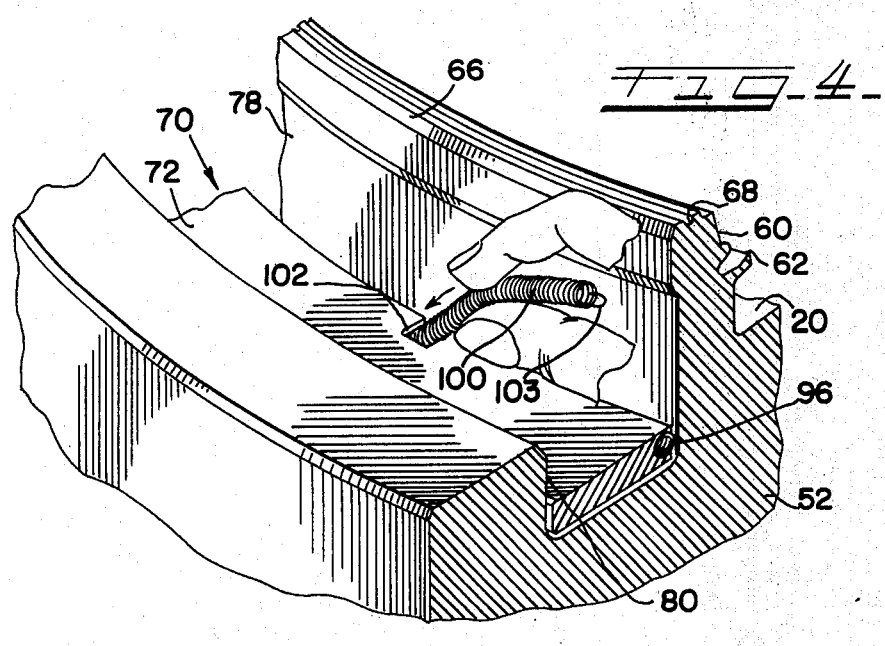
FIG. 4 is a fragmentary perspective view, to an enlarged scale, showing a portion of the top mold member in inverted position with the stripper and stamping hold down ring positioned thereon and illustrating the manner in which the garter spring retainer member may be assembled with the ring when in this position.

The top mold member 52 has a downwardly facing annular recess 70 in which there is mounted a spring pressed stripper plate 72 which, in addition to its stripping function, serves to clamp the stamping 34 in position, initially, by engagement of the bottommost face 74 with the top edge 76 of the stamping 34 as the top mold assembly 12 is moved into position on the bottom mold assembly 14. The recess 70 is defined by inner and outer vertical wall portions 78 and 80, which are radially spaced, and the downwardly facing wall 82 which forms the bottom of the recess. A series of annularly spaced compression springs 84 are seated at one end in pocket formations 86 in the face 82 with their opposite ends in shallow depth pocket formations 88 in the top face 90 of the plate member 72 and tend to urge the plate in a downward direction. The wall 78 has a radially outwardly projecting rib formation 92 with a top shoulder 94 forming a stop for limiting downward movement of the plate member 72. The plate member 72 is provided with a groove 96 opening on the inner edge 98 of the plate in which a greater spring 100 is adapted to be seated. The groove 96 is of circular cross section and located so that the innermost side is open allowing a portion of the garter spring 100 to project inwardly of the edge face 98. The plate 72 is dimensioned so that with the groove 96 empty the plate 72 may be inserted in the recess 70 past the rib formation 92, as shown in FIG. 4, after which the garter spring 100 may be positioned in the groove 96 by threading it through a downwardly opening radially extending aperture or slot 102 opening into the groove 96 with the spring extending beyond the plate edge 98 a sufficient distance to engage the shoulder 94 and form a stop which prevents further downward movement of the plate member 72 under the influence of the springs 84. The garter spring arrangement cooperates with the shoulder stop 94 in limiting the movement of the plate 72 and serves as a retention means preventing unintentional disassembly while the garter spring 100 is in place in the groove 96. The spring 100 may be formed at the end with a loop 103 enabling its ready removal by a small hook end tool when disassembly is desired.

The top mold member 52 has a downwardly facing area 104 extending radially outwardly of the annual recess 70 which is located so as to engage or seat on the top surface 50 of the ring member 42 of the bottom mold assembly 14 and which is in a plane at an elevation relative to the elevation of the land 66 to relieve the strain on the land 66 and the associated mold area 105 above it, when the mold is fully closed, thereby enabling this portion of the mold member 52 to be held to a relatively small radial dimension without undue risk of damage in use so as to accommodate small diameter stamping members 34.

Figure 2:
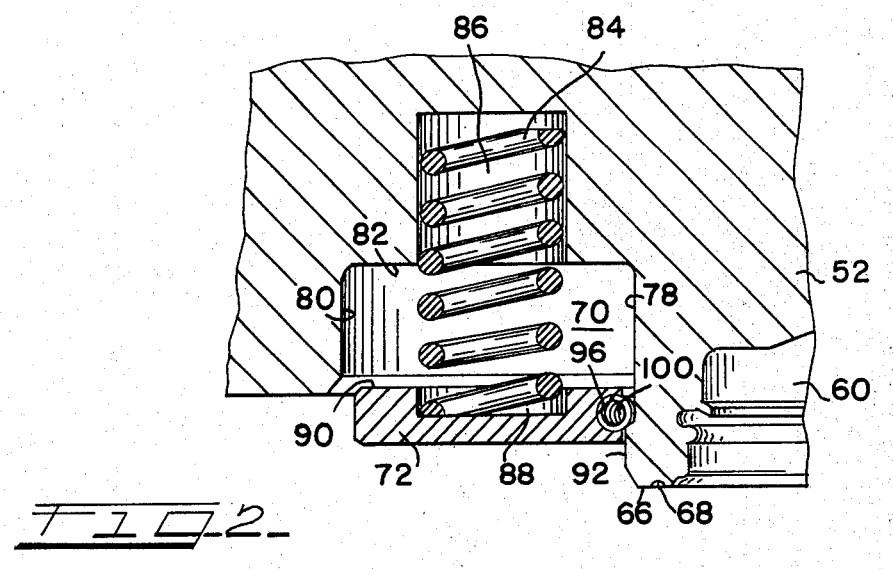
FIG. 2 is a fragmentary vertical sectional view showing a portion of the top mold member removed from the assembly shown in FIG. 1.
Figure 3:
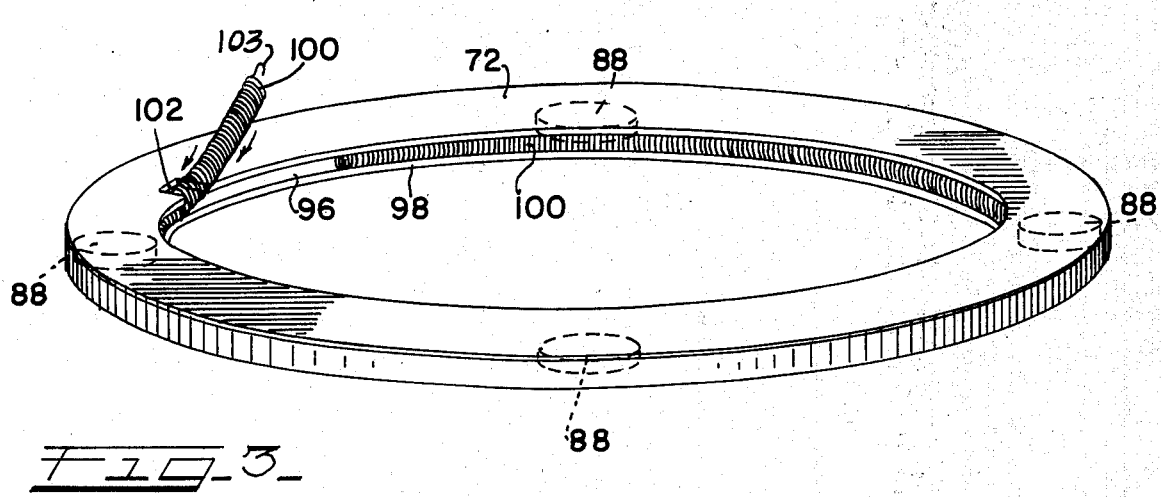
FIG. 3 is a perspective view, to an enlarged scale, showing the stripper and stamping hold down ring member in inverted position and illustrating the manner in which the garter spring is assembled with it.

In the use of the mold assemblies 12 and 14 the stamping 34 is positioned in the annular recess 44 of the bottom mold assembly 14 and the top mold assembly 12 is lowered into position with the spring pressed plate member 72 in its lowermost position, as shown in FIG. 2. The plate 72 will engage the top edge 76 of the stamping 34 as the member 52 is lowered and hold it in position until the inner margin is engaged by the land 66 in the fully closed position where the members are ready to receive the fluent rubber in the mold cavity 24. Upon completion of the curing operation the top mold assembly is raised sufficiently to permit removal of the seal product. The stripper plate 72 holds the seal product in the recess 44 until the cavity forming wall 60 is free of the molded product, that is, until the seal product is stripped from the top member 52. The stripper plate 72 rides in the recess 70 of the mold member 52 under the control of the springs 84 with minimum danage or wear on the wall surface 78 while performing the triple functions of centering itself, initially holding down the stamping 34 while the mold members are being closed on each other and subsequently stripping the molded product from the top member when the members are opened to remove the product.

Referring now to certain particular advantages of the construction shown in the drawings, and to the manner in which prior art problems have been thereby overcome, one practice in the prior art had been to provide, in place of the plate member or stripper ring 72, merely a plurality of springs, such as the spring 74 each terminating at its lower end in a cup of cup washer assembly, retained in place by a shoulder bolt of a known type. With this construction, accurate, uniform, and reliable hold-down and stripper action was not able to be obtained. This is because the springs might not be accurately calibrated, and also because the retainer system permitted springs to deflect from side to side. In the present arrangement, the aligned locations of the pocket formation or bore 86 and the well or pocket 88 overcome this problem. Moreover, in prior art constructions of the type just described, it was necessary that the marginal edge 76 of the stamping flange 34 be centered with respect to the spring corresponding to spring 84. Otherwise, the tendency of the outwardly extending prior art springs to deflect freely about was aggravated.

Referring now to another prior art problem, it will first be understood by way of background that, referring to FIG. 2, for example, the stamping pinch-off or land area, which includes the land 66 and the flash groove 68, is situated in a portion of the upper insert 52 which undergoes high stress concentrations during use. Accordingly, when attempts were made in the prior art to form a radially inwardly extending groove in the wall 78, this area was found to be weakened past acceptable limits. With the rib 92 of the present configuration, the lower portion of the top mold member 52, which includes the land 66 and the groove 68, displays excellent strength, thereby providing a long service life. It will be appreciated that the area just above the land and groove 66, 68 cannot be arbitrarily thickened for strength, because this would dictate making seals with too-large radial flanges 38.

In the past, it has been common to use a radially acting snap ring of a leaf spring material, such as a "Truarc" or "Circlip" brand or type, with such snap rings including ears having openings to receive the prongs of an instrument for inserting and removing the retainer. However, rings of this type, particularly in large diameters, are not readily available except on special order. These rings are also normally very expensive. However, most importantly, there is no practical way of inserting a snap ring of this type into a close tolerance fit area. In other words, because the retainer must both slide with a close fit along the wall 78 and also engage the rib 92, there is simply no physical room for a snap ring which could be readily inserted and removed in this way and still perform its centering and functions.

The coil spring concept of the present invention makes insertion and removal of the ring a very simple matter, without in any way commmpromising its effectiveness.

In this connection, the coil spring concept has two further advantages, one of which resides in the fact that the spring 100 has an inside diameter which is only larger by a working clearance than the outside diameter of the surface 78. This provides a combination of positive centering and low friction likewise not available in a snap ring construction.

In the present construction, the shoulder forming transition between the wall surface 78 and the rib 92 engages the spring 100 to retain the stripper in its lowermost position. The round garter spring 100 provides an excellent positive retention, but, unlike a snap ring, it does not have sharp edges which tend to damage the hardened mold parts. Repeated blows by a snap ring rapidly damage the various mold parts by chipping, scoring, or otherwise creating areas of highh stress concentration and early potential failure.

A further advantage of the present invention is that, by locating the spring pockets or wells 86 in the upper mold member 52, and using a relatively wide stripper plate 72, a stronger mold may be made. This is because, where large diameter stampings are used, and where the older method of stripping by the use of individual springs was used, the pocket or well corresponding to the pocket 86 needed to be located toward the radially outer portion of the mold, thereby leaving unsupported areas toward the outer edge thereof, and in turn resulting in a less strong mold member. For example, drilling and tapping holes for stripper pins was known in the prior art to weaken the mold in area thereof wherein openings for the locating pins were situated.

According to the present invention, the spring well is always located in a predetermined position generally centrally of the stripper plate; however the stripper plate can extend radially outwardly from its associated spring a considerable distance without loss of effect.

Replacement of the stripper plate 72 and other maintenance tasks, are exceptionally easy to accomplish according to the present invention. Removal of the garter spring 100 is likewise exceptionally easy, merely by using the spring tool referred to above, and replacement is correspondingly simple. Accordingly, the provision of the garter spring 100 in combination with its groove 96, the removal eye 103 and the insertion opening 102 provides a stripper plate assembly with good centering action, ease of movement, and a strong but gentle stripper retention action which was unknown in the prior art. These advantages are achieved at low cost, using readily available parts and simple methods. Reliability of the system in use has proved exceptional.

Although the stripper plate and retainer system of the invention has proved exceptionally advantageous when used in single cavity injection molds, the concept is equally applicable to compression or transfer molding, in single or multiple cavity applications. Thus, the present invention, while very desirable for use in single cavity molds, is not strictly limited in application to such molds.

It will thus be seen that the present invention provides a novel molding apparatus having a spring-retained, single self-centering stripper plate adapted to act as a hold-down member during mold closing and a stripper plate during mold opening, said apparatus having number of advantages and characteristics, including those referred to herein and others wich are inherent in the invention. A preferred embodiment only having been described in detail by way of example, We contemplate that variations and modifications of the present invention will occur to those skilled in the art, and We anticipate that such variations and modifications may be made without departing from the spirit of the invention or the scope of the appended claims.

We claim:

1. An apparatus for making composite, insert-molded articles having a resilient portion bonded to a relatively rigid insert, said apparatus including first and second mold parts movable relative to each other along a given axis, with each of said parts having portions at least partially defining therebetween the cavity in which said resilient portion is to be molded, and further including portions defining cavity inlet means permitting flow of curable, article-forming material into said cavity, means on said first mold part for engaging one surface of said insert, means on said second mold part for engaging another surface portion of said insert, an annular, stripper ring-receiving recess in said second mold part, said recess being defined by at least one axially extending sidewall and a radially extending end wall, an annular stripper ring disposed within said recess in said second mold part and being mounted for axial movement between extended and retracted positions within said recess, a stripper ring stop rib disposed on said axial sidewall and spaced from said radial end wall, an annular, spring-receiving radial groove in said stripper ring, and stripper ring movement stop means including an annular coil spring disposed within said groove, engaging said groove on one diameter of said spring and spaced from said sidewall on the other of its diameters by a close working clearance, said coil spring engaging said stripper ring stop rib in said extended position of said stripper ring and being spaced axially from said rib in said retracted position of said stripper ring.

2. An apparatus as defined in claim 1 wherein said stripper ring recess and stripper ring are of sufficient radial width to accommodate insert members of varying diameters.

3. An apparatus as defined n claim 1 in which said stripper ring includes an axially directed opening communicating with said groove, said opening being adapted to permit ready removal and replacement of said annular coil spring within said stripper ring.

4. An apparatus as defined in claim 1 wherein said first and second mold parts include closely spaced apart, axially extending annular surfaces forming parts of said inlet means and directed toward each other, said surfaces being axially aligned with each other in the closed position of said mold parts.

5. An apparatus as defined in claim 1 wherein one of said first and second members further includes a tear-trim shoulder, whereby an axial opening movement of said second member in combination with axial movement of said stripper ring will strip said part from said cavity and tear said finished part from scrap lying partially within said cavity inlet area.

6. An apparatus as defined in claim 1 wherein resilient means is disposed between said second mold part and said stripper ring, thereby normally urging said ring toward said extending position.

7. An apparatus as defined in claim 6 wherein said resilient means comprises a plurality of axially disposed coil springs, and wherein said stripper ring and second mold part include, respectively, oppositely directed, axially extending pockets for receiving said springs.

* * * * *